United States Patent [19]
Pellegrino

[11] Patent Number: 5,868,241
[45] Date of Patent: Feb. 9, 1999

[54] VIBRATORY CONVEYOR HAVING SPRING-MOUNTING CROSS-MEMBER ASSEMBLIES

[75] Inventor: Stephen M. Pellegrino, Delmont, Pa.

[73] Assignee: FMC Corporation, Chicago, Ill.

[21] Appl. No.: 794,078

[22] Filed: Feb. 4, 1997

[51] Int. Cl.⁶ .................................................. B65G 27/08
[52] U.S. Cl. ............................................................ 198/763
[58] Field of Search ................................... 198/759, 763, 198/766

[56] References Cited

U.S. PATENT DOCUMENTS

| | | | |
|---|---|---|---|
| 3,165,197 | 1/1965 | Allen et al. ............................... | 198/763 |
| 4,272,366 | 6/1981 | Dean et al. ............................... | 198/763 |
| 4,313,535 | 2/1982 | Carmichael ............................... | 198/763 |

OTHER PUBLICATIONS

FMC Corporation. *The First Name in Food Handling Systems*, 1995, U.S.A.
FMC Corporation. *FMC Expresss Limited, 1996*, U.S.A.
FMC Corporation. Syntron VF Vibrating Conveyor, 1994, U.S.A.
FMC Corporation. *Link–Belt Model BL Vibrating Conveyors*, pp. 62–68, Not Dated.
Key Technology, Inc. *Iso–Flo "S" Conveyor*, Not Dated, pp. 84–85.
Key Technology, Inc. *Iso–Flo Smooth–Cycle Scale Feed Conveyor*, Not Dated, pp. 86–87.
Key Technology, Inc. *Iso–Flo Vibratory Conveyors*, Not Dated, pp. 48–49.

*Primary Examiner*—Joseph E. Valenza

[57] ABSTRACT

A base-excited vibratory conveyor includes an elongated conveyor trough, and an elongated support structure extending generally beneath the conveyor trough. A plurality of springs operatively interconnect the trough with the support structure, whereby vibratory drive of the support structure effects vibratory motion of the trough for conveyance of materials therealong. The support structure includes a plurality of cross-member assemblies which facilitate operative connection of the springs to the support structure, while enhancing the structural integrity of the support structure. The overall conveyor construction can be relatively lightweight in configuration, thus facilitating economical manufacture and operating efficiency.

9 Claims, 3 Drawing Sheets

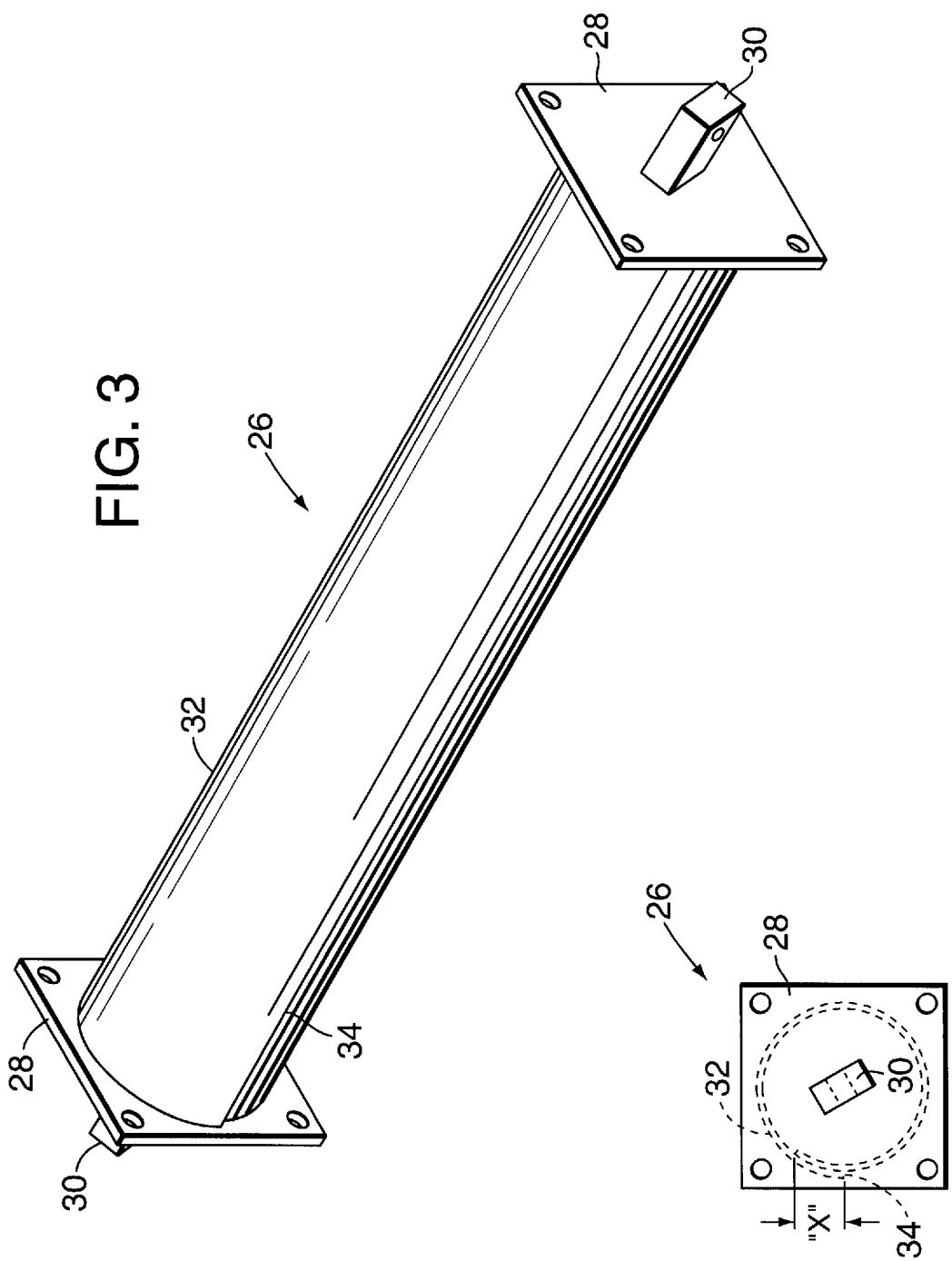

VIBRATORY CONVEYOR HAVING SPRING-MOUNTING CROSS-MEMBER ASSEMBLIES

TECHNICAL FIELD

The present invention relates generally to vibratory conveyor structures, and more particularly to an improved vibratory conveyor construction including a support structure having cross-member assemblies configured to facilitate operative connection of the conveyor springs to the support structure, while enhancing the structural integrity of the structure.

BACKGROUND OF THE INVENTION

Vibratory conveyor devices are in widespread use in view of their versatile material-handling capabilities. Such devices typically include a generally elongated trough or bed which is vibrated by an associated drive system so that material is conveyed along the length of the trough.

In typical constructions of so-called two mass vibratory conveyors, a support structure or base of the conveyor includes a pair of longitudinal base members typically constructed from heavy wall tubing or solid plate steel to obtain the desired structural characteristics, and in part to obtain the specifically desired weight relationship between the trough and the support structure. Generally speaking, the total stroke of the conveyor is divided between the trough and the support structure, including the base members, in inverse proportion to their mass ratio. Since it is desirable to minimize the vibratory motion of the support structure (to thereby facilitate isolation of the conveyor's transmitted vibration to surrounding structures), the support structure, including the base members, is typically more than twice the weight of the trough structure, and in some cases, as much as eight times or more in weight. In some designs, it is often necessary to add ballast weight to the support structure in order to obtain the desired base stroke. Some vibratory conveyor designs, like the base-excited conveyor, are inherently advantageous from an overall weight perspective, because the stroke of the base is dependent upon the tuning of the conveyor's spring/mass system with respect to the desired operating frequency.

In order to maintain the required stiffness of the support structure, and to prevent unwanted torsional and vertical bending modes of the structure that may be excited at the operating frequency of the conveyor, cross-members, typically made from steel tubes, angle, or channel sections, are connected between the longitudinal base members to form a stiff ladder-like frame construction. It is common practice to connect the spring-mounting elements of the conveyor at the points where these cross-members attach to the longitudinal base members to thereby take advantage of the structural support provided by the cross-members.

Experience has shown that one problem encountered with current conveyor designs is the cost associated with the weight, construction, and complexity of the support structure. This problem is aggravated if an all stainless steel construction is mandated by specific sanitation requirements for the conveyor application. While the base-excited conveyor design is more advantageous with respect to such considerations, it will be appreciated that it is desirable to further reduce the overall weight of the machine, while maintaining the same operating capacity, thus providing desired operating efficiencies.

To this end, efforts have been made to develop a base-excited conveyor construction employing the lightest possible support structure construction. However, because of the lightweight formed sheet metal sections used in this construction, it is necessary to avoid fatigue failure at the spring connections to the base members which could result from concentrated shear and bending loads to which the base members are subjected at the spring connections. While previous constructions have employed so-called "scab" reinforcing plates, castings, blocks, or the like for longitudinally spreading the loads to which the mounting blocks for the springs are subjected, such constructions necessarily result in a heavier construction. This, of course, is self-defeating in the context of providing a relatively lightweight base-excited conveyor construction.

The present invention contemplates an improved vibratory conveyor construction, including an improved support structure which can be configured from relatively lightweight components, thus facilitating economical manufacture and operating efficiency.

SUMMARY OF THE INVENTION

The vibratory conveyor construction embodying the principles of the present invention includes an improved support structure having cross-member assemblies which facilitate connection of springs of the conveyor to relatively light, thin, longitudinal base members of the support structure. The arrangement is configured to substantially abate fatigue failure, with the preferred connection of the cross-member assemblies to the base members with mechanical fasteners desirably minimizing heat warpage that can occur attendant to welding of sheet metal structures. By positioning the spring-mounts at those portions which are rigidified by the cross-member assemblies, the structural integrity of the support structure, and the spring connections, is desirably enhanced.

In accordance with the illustrated embodiment, the present vibratory conveyor includes a generally elongated conveyor trough along which material is conveyed. The conveyor further includes an elongated support structure extending generally beneath the conveyor bed, and a plurality of springs operatively connecting the conveyor bed to the support structure. In a base-excited conveyor design, a vibratory drive is operatively connected to the support structure, the vibration of which, in turn, effects vibratory motion of the conveyor trough via the plurality of springs interconnecting the trough and the support structure.

In accordance with the present invention, the support structure comprises a pair of laterally spaced, longitudinally extending base members, and a plurality of transversely extending spring-mount cross-member assemblies for connecting the springs of the conveyor to the base members. In the preferred relatively lightweight configuration of the present conveyor, each of the longitudinally extending base members has a generally inwardly open, channel-like configuration, including a vertical web portion, and upper and lower flange portions respectively extending from the web portion.

Each of the cross-member assemblies is of a straightforward fabricated configuration, preferably of a standardized design to take advantage of manufacturing scale, and to minimize cost and improve manufacturing turnaround time. In particular, each cross-member assembly comprises a pair of end plates respectively connected to an inside surface of the web portions of the base members, and a pair of spring-mounts respectively mounted on the end plates for respective mounting of a pair of the springs of the conveyor thereto. In the preferred form, each spring-mount extends through an opening in the web portion of the respective one of the base members, thus facilitating connection of the associated springs generally along the outsides of the laterally spaced base members.

Each cross-member assembly further comprises a tubular cross-member joined to and extending between the end plates. In the preferred embodiment, the tubular member has a generally circular cross-section, and is formed from rolled steel sheet to include a welded, overlapping seam portion. In the preferred form, each of the end plates of the cross-member assembly is generally rectangular, and is connected to the web portion of the respective one of the base members by a plurality of mechanical fasteners.

Other features and advantages of the present invention will become readily apparent from the following detailed description, the accompanying drawings, and the appended claims.

BRIEF DESCRIPTION OF THE DRAWINGS

FIG. 3 is a perspective view of a spring-mount cross-member assembly of the vibratory conveyor illustrated in FIGS. 1 and 2; and FIG. 4 is an end view of the cross-member assembly illustrated in FIG. 3.

DETAILED DESCRIPTION

Figure 1:
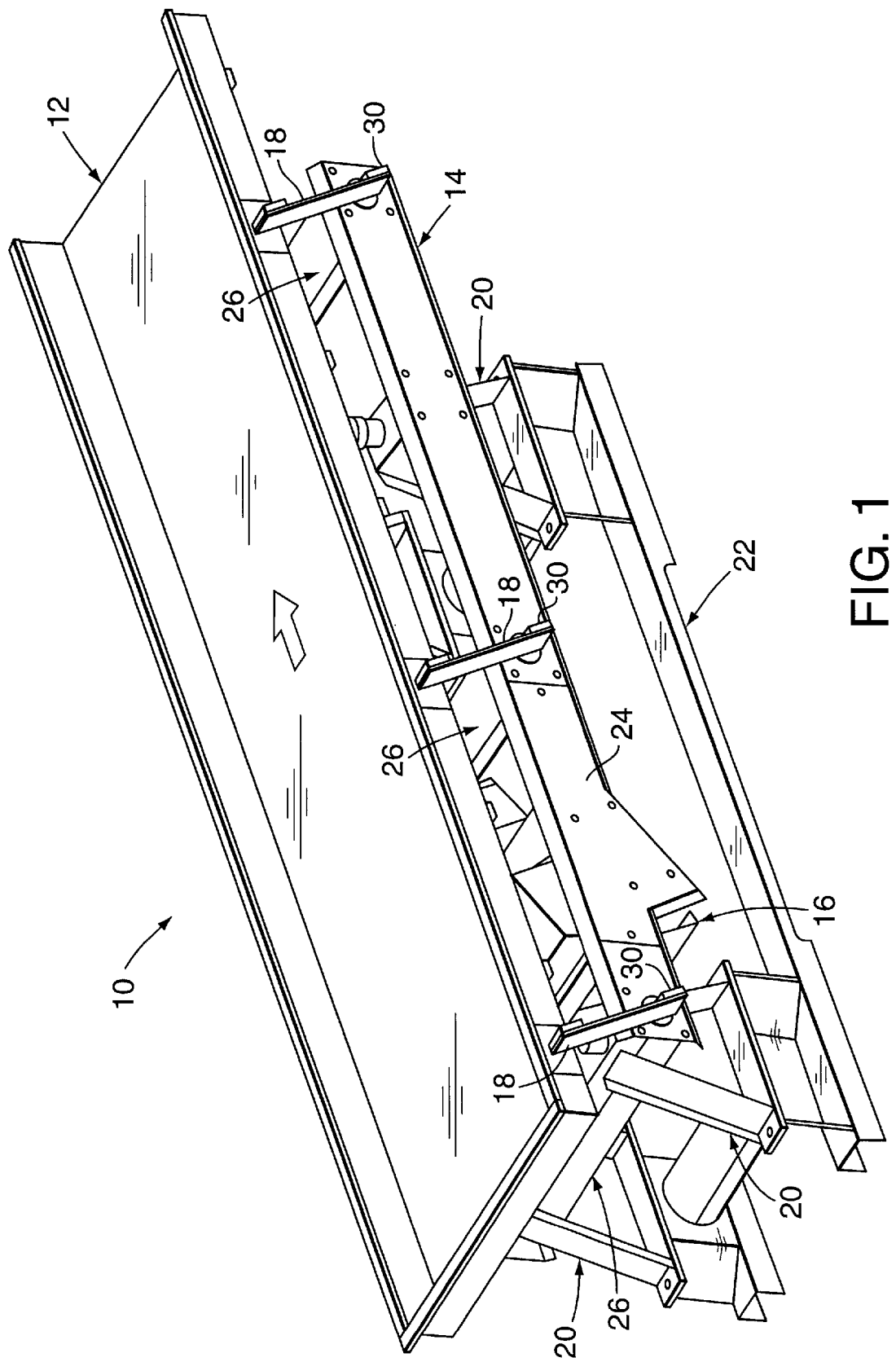
FIG. 1 is a perspective view of a vibratory conveyor embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Figure 2:
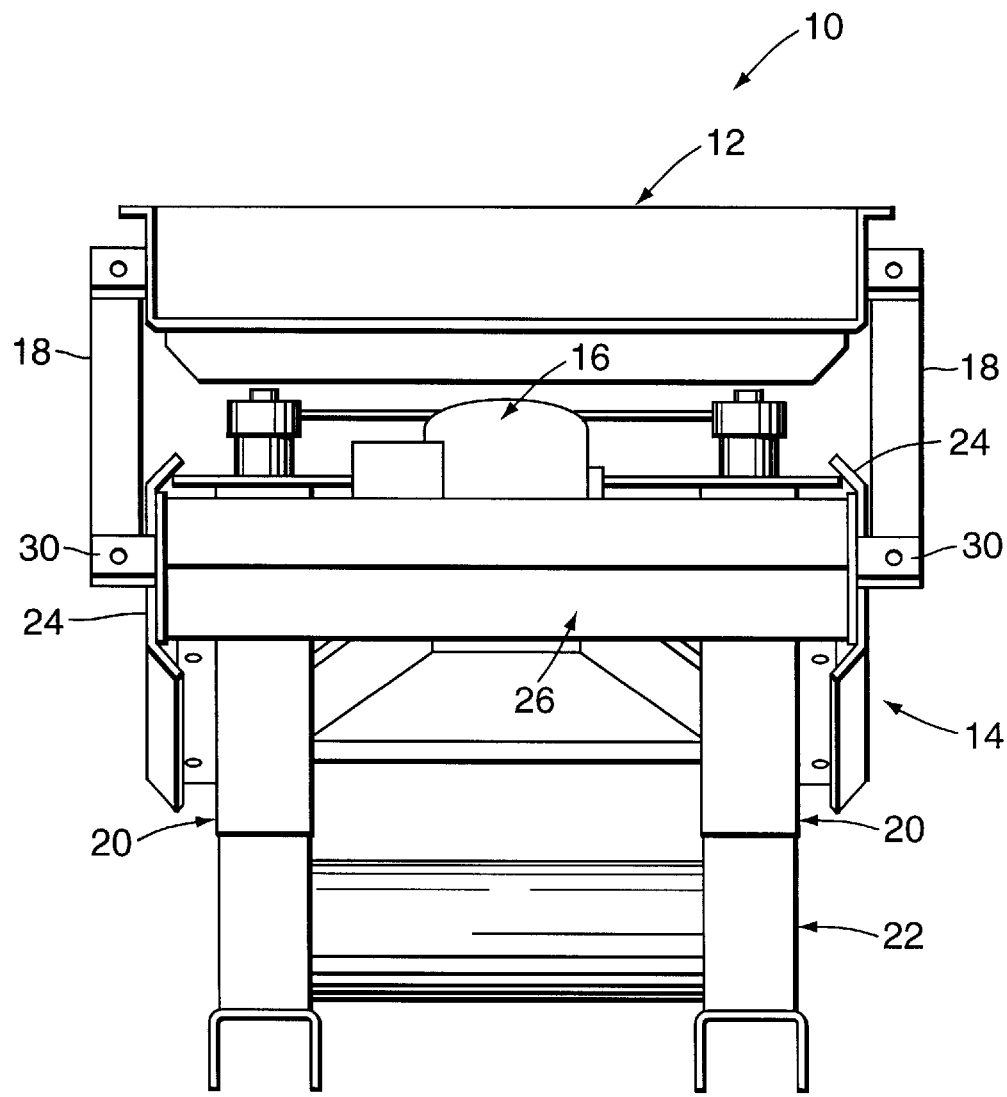
FIG. 2 is an end view of the vibratory conveyor illustrated in FIG. 1.

With reference to FIGS. 1 and 2, therein is illustrated a vibratory conveyor 10 embodying the principles of the present invention. It is contemplated that vibratory conveyor 10 can advantageously be configured as a so-called base-excited conveyor, that is, include a vibratory drive which is mounted on a support structure (or base) of the conveyor. Vibration of the support structure, in turn, acts through a plurality of springs to effect vibratory motion of the trough of the conveyor along which material is conveyed. As will be recognized by those familiar with the art, the present conveyor construction has been provided with a relatively lightweight configuration, thus facilitating economical manufacture and operating efficiency.

The conveyor 10 includes a generally elongated conveyor trough or bed 12 along which material is conveyed, in the direction indicated by the arrow in FIG. 1. The conveyor 10 further includes an elongated support structure 14 extending generally beneath the conveyor trough 12. A vibratory drive, generally designated 16, is mounted on the support structure 14, with vibration of the support structure in turn acting through a plurality of springs 18 which operatively connect the support structure 14 with conveyor trough 12. In this manner, vibratory drive of the support structure imparts material-conveying vibratory motion to the conveyor trough 12 via springs 18. Springs 18 may each comprise one or more leaf springs, as illustrated.

The support structure 14 of the conveyor 10 is mounted upon a plurality of A-frames 20, which in turn are operatively connected to a mounting frame 22.

The support structure 14 of the conveyor 10 includes a pair of laterally spaced, longitudinally extending base members 24 each preferably having a generally inwardly open, channel-like configuration. As such, each of the base members 24 includes a vertically oriented web portion, and upper and lower flanges extending from the web portion. In accordance with the present invention, the support structure 14 further includes a plurality of longitudinally spaced, transversely extending spring-mount cross-member assemblies 26 which extend between and are connected to the pair of laterally spaced base members 24. Again, it will be appreciated, the overall construction of the support structure 14 is of a generally lightweight configuration, thereby promoting operating efficiency of the conveyor structure.

FIGS. 3 and 4 illustrate the features of each of the cross-member assemblies 26. Each of the assemblies 26 includes a pair of end plates 28, preferably of a rectangular configuration, and a pair of spring-mounts 30 respectively mounted, such as by welding, on the end plates 28. Each cross-member assembly further includes a preferably tubular cross-member 32, preferably having a generally circular cross-sectional configuration, as best illustrated in FIG. 4. In the preferred form, the tubular cross-member 32 is formed from rolled sheet stock, and includes a welded overlapping seam portion, at 34. In a current embodiment, wherein the tubular cross-member 32 has a six inch outside diameter, an overlap of approximately one inch, as shown at dimension X in FIG. 4, has been employed.

Each of the cross-member assemblies 26 (three being shown in the illustrated embodiment) extends between the laterally spaced base members 24, with the end plates 28 of each cross-member assembly 26 respectively connected to the inwardly facing surface of the web portion of the respective one of the base members 24. In order to minimize distortion of the various components of the support structure 14, it is presently preferred that the rectangular end plates 28 of each cross-member assembly be connected to the respective one of the base members 24 by a plurality of mechanical fasteners. The components may further be assembled by welding, if necessary, with the preferred use of the mechanical fasteners minimizing the need for welding to thereby desirably avoid heat-distortion of the components of the support structure.

The operative connection of springs 18 between the conveyor trough 12 and the elongated support structure 14 is illustrated in FIGS. 1 and 2. The end plates 28 of each of the cross-member assemblies 26 are preferably connected on an inside surface of the web portions of the base members 24, with the spring-mounts 30 of the cross-member assemblies extending through respective openings defined by the web portions of the base members 24. One end of each of the springs 18 can thus be connected to a respective one of the spring-mounts 30, such as by a suitable mechanical fastener or the like, with the springs 18 thus providing the desired operative connection of the support structure to the conveyor trough 12 for transmission of vibratory forces from the support structure to the conveyor trough.

In a current embodiment, each of the cross-member assemblies 26 includes a relatively thin, 12-gauge sheet steel tubular cross-member 32 rolled to form a six-inch outside diameter tube. This structure has been found to be sufficiently stiff, yet light, in keeping with the objective of a relatively lightweight support structure 14. Economical fabrication can be facilitated by pre-rolling the sheet material, and then cutting the cross-members 32 to length as may be required for specific applications. End plates 28 formed from 7-gauge sheet steel have been employed, with each spring-mount 30 respectively welded thereto. These end plates 28 are then welded to each end of the tubular cross-member 32, with use of a fixture during the welding process facilitating correct alignment of the spring-mounts to obtain the desired spring angle when the support structure 14 is assembled with the conveyor trough.

During assembly, openings through which the spring-mounts 30 extend, and openings for the mechanical fasteners (four for each end plate 28 in the illustrated embodiment) are cut in the web portion of each longitudinally extending base member 24. Each of the cross-member assemblies can then be bolted in place, with any additional welding effected, as required. As will be appreciated, this configuration results in distribution of the spring loads through the end plate 28 of the cross-member assembly, and through the bolted connections into the web portion of the base member 24. This configuration desirably avoids the effect of welded "scab" plates as heretofore known, which welding frequently creates sufficient heat to warp the support structure, undesirably requiring subsequent straightening of the structure.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A vibratory conveyor comprising:

an elongated conveyor trough along which material is conveyed;

an elongated support structure extending generally beneath said conveyor bed; and a plurality of springs operatively connecting said conveyor bed to said support structure;

said support structure comprising a pair of laterally spaced, longitudinally extending base members, and a plurality of transversely extending spring-mount cross-member assemblies for connecting said springs to said base members, each said spring-mount cross-member assemblies comprising a pair of end plates respectively connected to said pair of base members, a pair of spring-mounts respectively mounted on said end plates for respective mounting of a pair of said springs thereto, and a cross-member joined to and extending between said end plates, to thereby facilitate operative connection of said springs to said base members while enhancing the structural integrity of said support structure.

2. A vibratory conveyor in accordance with claim 1, wherein each of said end plates is connected to an inwardly facing surface of the respective one of said base members, each of said spring-mounts extending through an opening in the respective one of said base members.

3. A vibratory conveyor in accordance with claim 1, wherein said cross-member of each said cross-member assembly comprises a tubular member.

4. A vibratory conveyor in accordance with claim 3, wherein said tubular member has a generally circular cross-sectional configuration and includes a welded, overlapping seam portion.

5. A vibratory conveyor in accordance with claim 2, wherein each of said end plates of each of said cross-member assemblies is connected to the respective one of said base members by a plurality of mechanical fasteners.

6. A vibratory conveyor comprising:

an elongated conveyor trough along which material is conveyed;

an elongated support structure extending generally beneath said conveyor bed; and a plurality of springs operatively connecting said conveyor bed to said support structure, said support structure comprising a pair of laterally spaced, longitudinally extending base members each having an inwardly open channel-like configuration including a web portion and upper and lower flange portions, said support structure further comprising a plurality of transversely extending spring-mount cross-member assemblies for connecting said springs to said base members, each of said spring-mount cross-member assemblies comprising a pair of end plates respectively connected to an inside surface of said web portions of said pair of base members, and a pair of spring-mounts respectively mounted on said end plates for respective mounting of a pair of said springs thereto, each said spring-mount extending through an opening in the respective one of said base members, each said cross-member assembly further comprising a tubular cross-member joined to and extending between said end plates, to thereby facilitate operative connection of said springs to said base members while enhancing the structural integrity of said support structure.

7. A vibratory conveyor in accordance with claim 6, wherein said tubular cross-member of each said cross-member assembly has a generally circular cross-section configuration and includes a welded, overlapping seam portion.

8. A vibratory conveyor in accordance with claim 6, wherein each of said end plates of each of said cross-member assemblies is generally rectangular and is connected to the web portion of the respective one of said base members by a plurality of mechanical fasteners.

9. A vibratory conveyor in accordance with claim 6, wherein each of said springs comprise a leaf spring.

* * * * *